United States Patent
Boyer et al.

(10) Patent No.: US 11,110,648 B2
(45) Date of Patent: Sep. 7, 2021

(54) BUILD MATERIAL SWITCHING

(71) Applicant: MakerBot Industries, LLC, Brooklyn, NY (US)

(72) Inventors: Hugo Boyer, Brooklyn, NY (US); Ariel Douglas, Brooklyn, NY (US); Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 676 days.

(21) Appl. No.: 13/623,967

(22) Filed: Sep. 21, 2012

(65) Prior Publication Data

US 2014/0034214 A1    Feb. 6, 2014

Related U.S. Application Data

(60) Provisional application No. 61/677,749, filed on Jul. 31, 2012.

(51) Int. Cl.
| | | |
|---|---|---|
| *B29C 64/118* | (2017.01) | |
| *B33Y 30/00* | (2015.01) | |
| *B33Y 50/02* | (2015.01) | |
| *B33Y 50/00* | (2015.01) | |
| *B33Y 10/00* | (2015.01) | |
| *B33Y 40/00* | (2020.01) | |

(Continued)

(52) U.S. Cl.
CPC ............ *B29C 64/118* (2017.08); *B29C 64/00* (2017.08); *B29C 64/10* (2017.08); *B29C 64/106* (2017.08); *B29C 64/112* (2017.08); *B29C 64/386* (2017.08); *B29C 64/393* (2017.08); *B33Y 10/00* (2014.12); *B33Y 30/00* (2014.12); *B33Y 40/00* (2014.12); *B33Y 50/00* (2014.12); *B33Y 50/02* (2014.12); *B33Y 80/00* (2014.12)

(58) Field of Classification Search
CPC ............ B29C 67/0051; B29C 67/0055; B29C 67/0059; B29C 64/118; B29C 64/106
USPC ........................................................ 264/308
See application file for complete search history.

(56) References Cited

U.S. PATENT DOCUMENTS

| | | | | |
|---|---|---|---|---|
| 3,643,417 | A | * | 2/1972 | Irwin ............................... 57/202 |
| 4,032,382 | A | * | 6/1977 | Obeda .......................... 156/73.2 |

(Continued)

FOREIGN PATENT DOCUMENTS

JP      2008-30427 A  *  2/2008

OTHER PUBLICATIONS

Derwent Abstract of JP2008-30427A Feb. 14, 2008, 2008, Thomson Reuters, Derwent Week No. 200817, Accession No. 2008-C27986, pp. 1 and 2.*

(Continued)

*Primary Examiner* — Matthew J Daniels
(74) *Attorney, Agent, or Firm* — Strategic Patents, P.C.

(57) ABSTRACT

A three-dimensional printer uses transitional lengths of build material to facilitate changes from one color to another during a fabrication process, and more generally to achieve multi-color objects corresponding to color patterns on the surface of a three-dimensional model. The transitional lengths of build material may be positioned inside a fabricated object, such as for infill, or outside the fabricated object where undesirable aesthetic properties of the transitional lengths will not impact the desired distribution of colors on the surface of the fabricated object.

12 Claims, 5 Drawing Sheets

(51) Int. Cl.
*B29C 64/386* (2017.01)
*B29C 64/00* (2017.01)
*B29C 64/106* (2017.01)
*B29C 64/393* (2017.01)
*B29C 64/112* (2017.01)
*B29C 64/10* (2017.01)
*B33Y 80/00* (2015.01)

(56) References Cited

U.S. PATENT DOCUMENTS

| | | | |
|---|---|---|---|
| 6,129,872 A | 10/2000 | Jang | |
| 6,823,230 B1* | 11/2004 | Jamalabad | B33Y 50/02 700/119 |
| 7,163,655 B2* | 1/2007 | Weber et al. | 264/474 |
| 2008/0213419 A1* | 9/2008 | Skubic et al. | 425/113 |
| 2011/0070394 A1* | 3/2011 | Hopkins | B29C 48/92 428/80 |
| 2011/0076496 A1* | 3/2011 | Batchelder et al. | 428/373 |
| 2011/0172611 A1* | 7/2011 | Yoo et al. | 604/290 |

OTHER PUBLICATIONS

English Translation of JP2008-30427A; Translated for the USPTO by Phoenix Translations, Aug. 2016, cover and pp. 1-8.*
"3D Funpod", http://phlatboyz.blogspot.com/2012/02/3d-printed-micro-3d-3d-funpod-3d-funpod.html NPL-19 Feb. 8, 2012, pp. 1-3.
"Ultra-Bot 3D Printer, William Steele", http://www.kickstarter.com/projects/wjsteele/ultra-bot-3d-printer/posts/362119 NPL-20 Dec. 4, 2012, pp. 1-17.

* cited by examiner

BUILD MATERIAL SWITCHING

RELATED APPLICATIONS

This application claims the benefit of U.S. App. No. 61/677,749 filed on Jul. 31, 2012, the entire content of which is hereby incorporated by reference.

BACKGROUND

There remains a need three-dimensional printing systems capable of printing an object from a model that includes multiple build materials.

SUMMARY

A three-dimensional printer uses transitional lengths of build material to facilitate changes from one color to another during a fabrication process, and more generally to achieve multi-color objects corresponding to color patterns on the surface of a three-dimensional model. The transitional lengths of build material may be positioned inside a fabricated object, such as for infill, or outside the fabricated object where undesirable aesthetic properties of the transitional lengths will not impact the desired distribution of colors on the surface of the fabricated object.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a series of two dimensional paths to form a three-dimensional object from a digital model, it will be understood that numerous additive fabrication techniques are known in the art including without limitation multijet printing, stereolithography, Digital Light Processor ("DLP") three-dimensional printing, selective laser sintering, and so forth. Any such techniques that may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
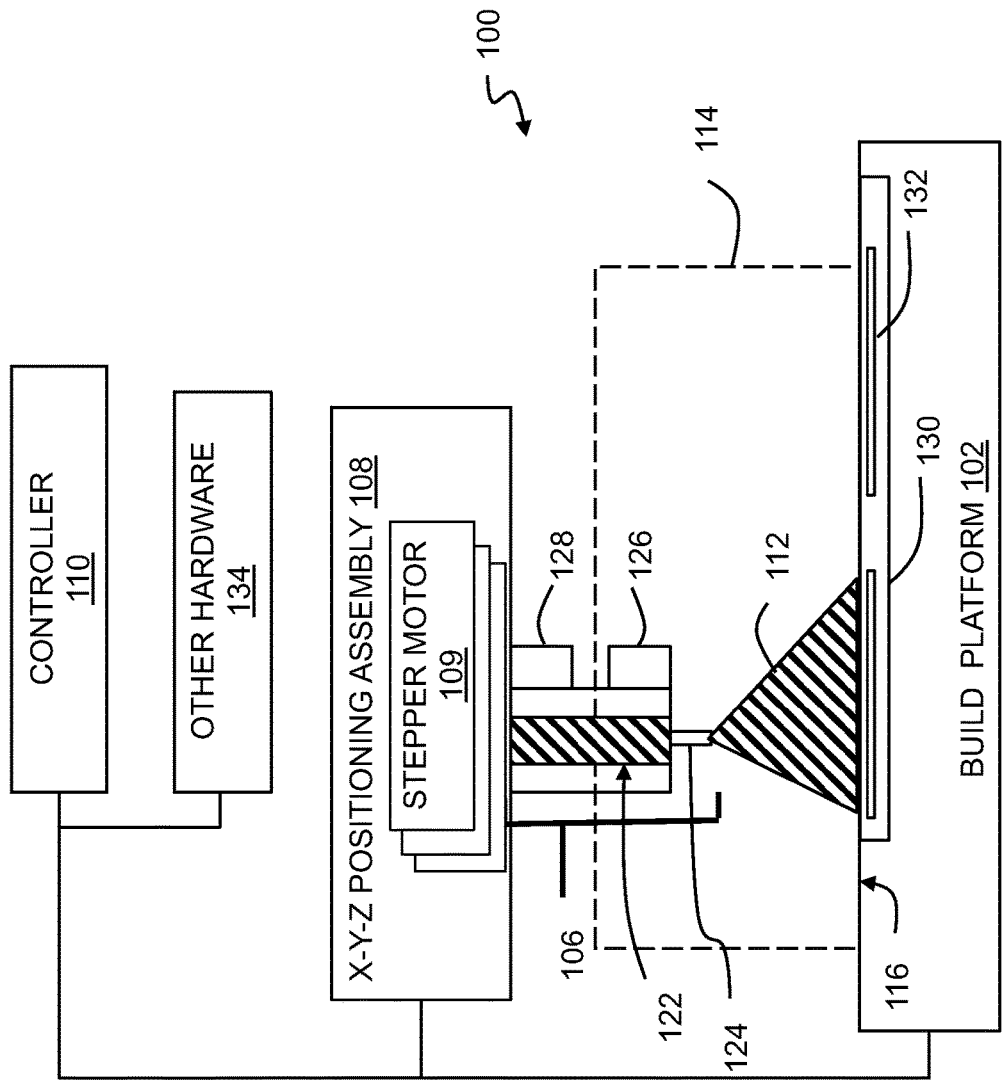
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

In general, the above system can build a three-dimensional object by depositing lines of build material in successive layers—two-dimensional patterns derived from the cross-sections of the three-dimensional object. As described below, three-dimensional printing may be augmented to accommodate multi-material builds.

Figure 2:
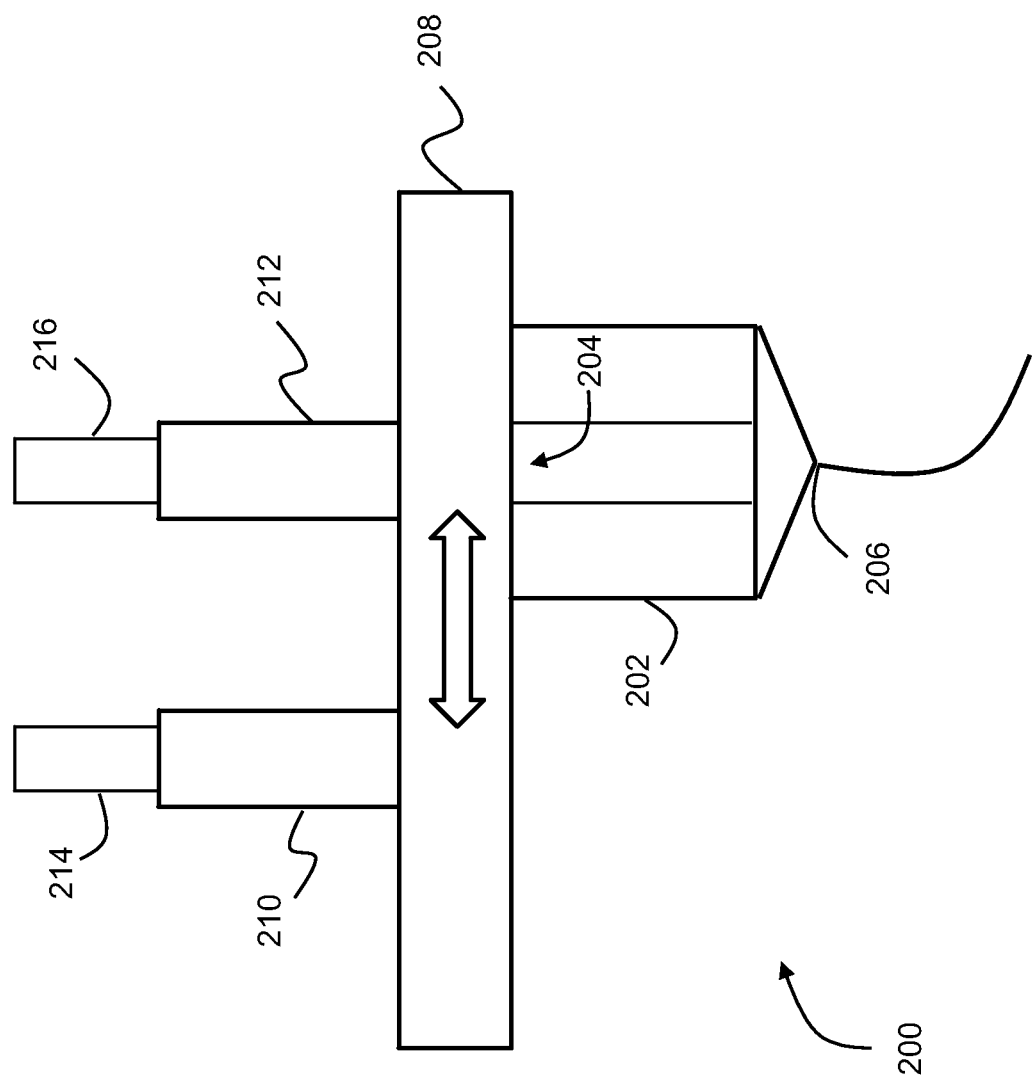
FIG. 2 depicts an extruder for multiple build materials.

FIG. 2 depicts an extruder for multiple build materials. In general, an extruder 200 of a three-dimensional printer may include an extrusion head 202 with a feed 204 and a nozzle 206, along with any suitable heating elements or the like as described above, along with a filament changer 208 and a processor such as any of the controllers described above.

The filament changer 208 may, for example include a first feed 210 and a second feed 212 that receive a first build material 214 and a second build material 216 respectively. The filament changer 208 may, for example slide horizontally over a blade or other cutting edge to cut one of the build materials 214, 216 that is being moved away from the feed 204 of the extruder 200 while moving the other one of the build materials 214, 216 into the feed 204 of the extruder 200. In one aspect, each of the feeds 210, 212 of the filament changer 208 may have an independent feed drive motor so that the new filament can be fed into a drive motor of the extruder 200 in a controlled manner as a loose end of the old filament is driven into the extruder 200. In this manner, an adequate driving force can be maintained for the extrusion process while the build material is changing. More generally, the filament changer 208 may be configured in any suitable fashion to receive a first filament (such as the first build material 214) and a second filament (such as the second build material 216) and to selectively deliver one of these filaments as a build material to the extruder 200. The filament changer 208 may be configured to switch between these supplies of material without interrupting the supply of material to the extruder 200, e.g., using the sliding structure described above; however it should be noted that the mechanical details of the filament changer 208 are not important, and any configuration capable of changing from one build material to another without an unrecoverable loss of extrusion from the extruder 200 may be suitable employed.

In a similar manner, the filament changer 208 may be configured to receive and select among any number of additional build materials (in filaments or other form) for feeding to the extruder 200, and to controllably select one of the build materials for extrusion under control of a processor or other control signal source. In other embodiments, two separate extruders may be alternately positioned along the tool path with similar affect.

A processor (not shown) may be configured to control the rate of delivery of build material from the extruder 200 and to control a selection of the first filament or the second filament by the filament changer 208. The processor may include any of the controllers described above. The processor may also control an x-y-z positioning assembly as described above along with the extruder 200 and the filament changer 208 to fabricate an object from a three-dimensional model. Where the three-dimensional model includes an exterior surface with two colors, the processor may control the filament changer 208 to change between two different build materials (e.g., of the two colors) in order to reproduce the two colors on an object fabricated from the three-dimensional model. Thus the colors from the three-dimensional model may be imparted on an exterior of the object according to the colors of the three-dimensional model, providing multi-color fabrication capabilities for the three-dimensional printer.

While color switching is one useful application of the systems and methods described herein, it will be further appreciated that the same techniques may be employed to switch between multiple build materials for a variety of other reasons. For example, different build materials may have different optical properties (opacity, color, finish, etc.), different mechanical properties (elasticity, strength, melting point, etc.), different chemical properties (curing conditions, solubility, etc.), thermal properties (insulation, etc.), electrical properties (conductance, etc.) and so forth, any of which might usefully be combined in an object fabricated from a model. The techniques described herein may be usefully employed to enable switching of build materials in any such multi-material models.

Figure 3:
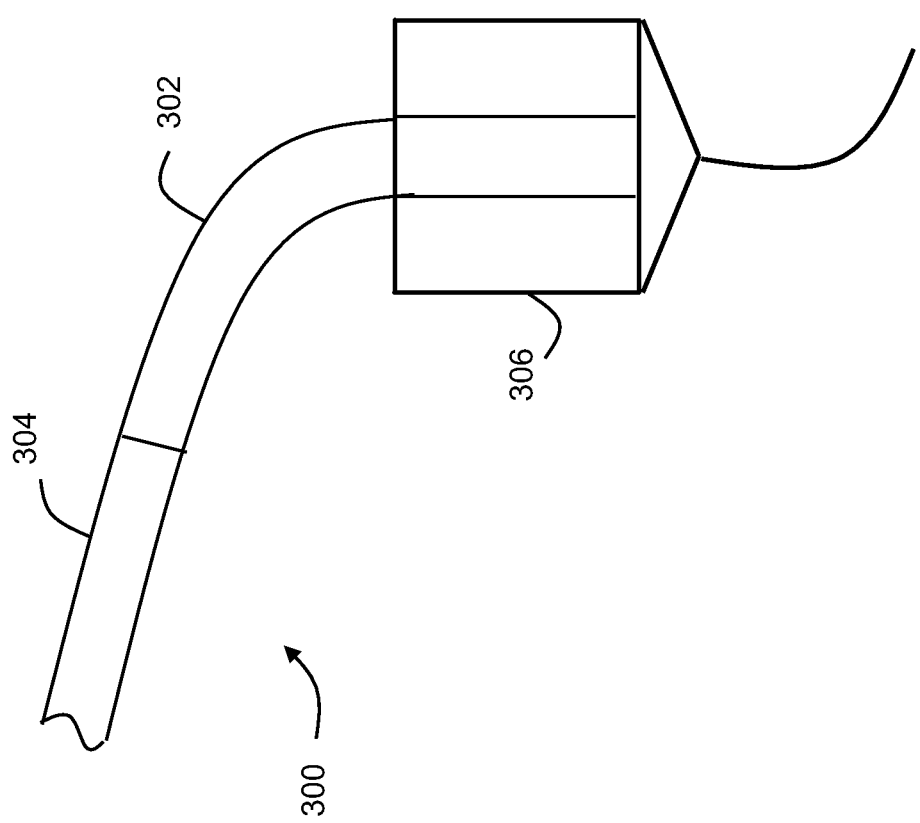
FIG. 3 depicts a feed with multiple build materials.

FIG. 3 depicts a feed with multiple build materials. While multi-material builds may be effectively realized using a filament switcher or the like to change build materials during fabrication, similar material changes may be achieved by pre-fabricating a filament 300 of several different materials coupled together in order to extrude at predetermined locations along a tool path. For example, a first build material 302 may be spliced to a second build material 304 to form a multi-material length of supply to a three-dimensional printer, e.g., to an extruder 306. For multi-colored builds, this may include splicing a number of lengths of materials having different colors to form a pre-colored filament before fabricating an object. By coordinating lengths and positions of various build materials with a tool path for a build, the materials may be deposited in predetermined locations within an object to achieve a desired color pattern, or other pattern of different build materials.

As used herein, the term "splice" is intended to refer to any mechanical coupling of two lengths of material. For example, splicing may include coupling lengths of material with a mechanical linkage formed in corresponding ends of the lengths of material, such as a dovetail or other mechanically coupleable feature(s). Splicing may include bonding lengths of material with an ultrasonic weld, an adhesive, or for thermoplastics and the like, with an application of heat and pressure to the adjoining pieces. In this manner, any number of different materials in any number of different lengths may be coupled together to form a single feed of composite material.

Figure 4:
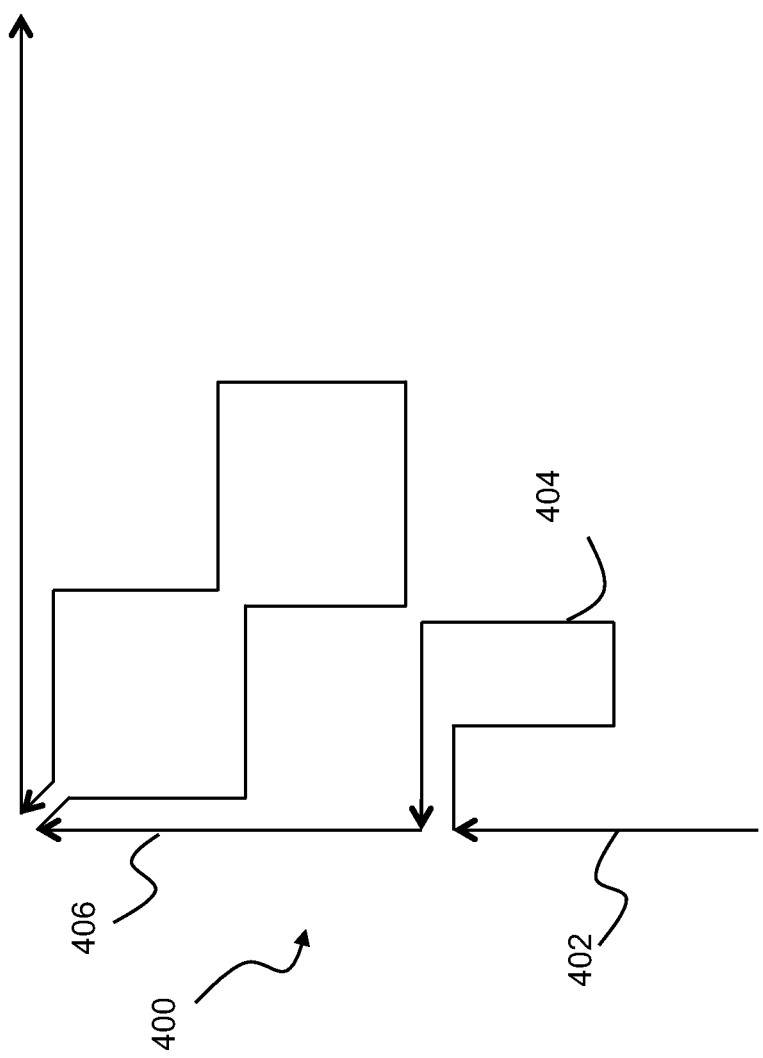
FIG. 4 depicts a cross section of a multi-material build.

FIG. 4 depicts a cross section of a multi-material build. More particularly, FIG. 4 depicts a portion of a tool path using multiple build materials to obtain different colors on an exterior of an object. A first segment 402 of a tool path 400 may traverse a portion of an exterior surface of an object with a first color, such as red. The tool path 400 may then turn in toward an interior of the object and infill with a transition segment 404 between the first color and a second color, such as blue. After the transition is complete and the second color can be extruded without mixing from the first color, the tool path 400 may return to the exterior of the object and the tool path 400 may provide a third segment 406 traversing a different portion of the exterior with the second color.

The ability to position different segments, and in particular transition segments, at suitable locations along a tool path in order to achieve specific colors (or more generally build materials) at specific locations within the object depends in part on how material flows through an extrusion nozzle. To be sure, one simple approximation can rely on the volume of build material displaced during an extrusion process, and this may suffice for many applications. However, where the process switches from one color to another, an old color may linger within an extrusion nozzle due to non-laminar flow, adhesion of the materials to the inside walls of the nozzle, and so forth. As such, it may be appropriate to provide a safety margin for the transition from one color to another, or to empirically determine adequate lengths of transition segments for various color changes, or to monitor extruder output with a camera or the like. These various techniques are discussed below.

The representation of FIG. 4 is provided for purposes of illustration only, and it will be readily appreciated that the tool path may include any number of excursions from the exterior surface, including excursions into the interior (which may follow an existing infill pattern—the geometric pattern used to fill the interior of an object—or depart from an existing infill pattern to deposit, e.g., within void spaces between infilling boundaries) or outside the exterior of the object where sacrificial build material may be extruded during transitions from on color (or material) to the next. It will also be understood that the term "tool path" may refer to either tool instructions in digital form or to the physical path of a tool during a build, and both meanings are generally intended unless a more specific meaning is explicitly provided or otherwise clear from the context. The following description addresses in more detail how material transitions can be coordinated with a tool path to position colors at predetermined locations on (or in) an object.

Figure 5:
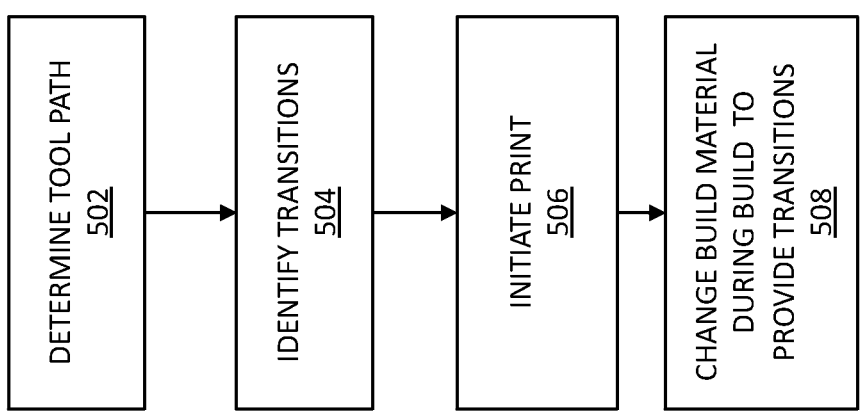
FIG. 5 shows a method for using multiple build materials.

FIG. 5 shows a method for using multiple build materials. In general, the process 500 below may be employed for three-dimensional fabrication using any of the extruders described above. While emphasis in the following description is upon a change from one color to another—a visually intuitive transition—it will be appreciated that these techniques may be similarly employed with a variety of changes in build material, as appropriate for example for varying optical properties (e.g., translucence or finish), mechanical properties (strength, melt temperature, elasticity), cost, and so forth. Thus the references to changes in and patterns of colors provided below should be understood to apply equally to any changes of build material that might be usefully employed in fabrication of a three-dimensional object from a model.

As shown in step 502, the process 500 may begin by determining a tool path for an extruder to fabricate an object from a three-dimensional model that includes a pattern of colors on a surface thereof. Techniques for determining tool paths are well known in the art, and details of such techniques are omitted in order to emphasize the relevant features of this disclosure.

As shown in step 504, the process 500 may include identifying a transition including a beginning and an end along the tool path for a change from a first color of the pattern of colors to a second color of the pattern of colors that results in a portion of the pattern of colors on the surface. The pattern of colors for this transition may be obtained from a variety of sources. It may, for example be obtained from a digital image, texture map, or other image source applied to a surface of the digital model from which the object is fabricated. More generally, any source of colors or imagery, whether computer-generated, human-generated, or some combination of these, may be used. A similarly wide array of sources may be used for other build materials selected for, e.g., cost, mechanical properties, optical properties, chemical properties, and so forth. Provided that the source model, or metadata or the like for the source model, identifies specific materials in specific locations, the techniques described herein may be usefully employed to achieve the desired distribution of such materials within a fabricated object based upon the model.

As noted above, the length of a transition depends generally upon the manner in which build materials flow through an extruder, and upon the amount of time (or distance along the tool path, which is effectively the same thing for a known volumetric flow rate) required for the first build material to evacuate (or substantially evacuate) the extruder. By knowing where along the tool path the change can start and where the change must be completed, the point at which input to the extruder must switch from one material to another can be determined. This may be calculated based upon volumetric displacement through the extruder, and may be adjusted according to estimated or actual latency due to, e.g., adhesion of material to the interior walls of the extruder that causes streaking of other transitional discoloration or incomplete color changing. Similarly, the transitional length may be empirically determined and/or calibrated for a machine.

Once a transition is identified, the tool path may be altered to accommodate its length. As such, the steps of determining a tool path and identifying transitions may by programmatically intertwined. So even though these two steps are illustrated as discrete, sequential steps in the process 500, they can be performed concurrently, iteratively, or in any other shared or cooperative manner. In another aspect, the tool path for each transition may be appended to the existing tool path in any suitable manner (such as by extruding the transition outside of the model, or within the interstitial space between infill structures) in order to permit sequential processing of the tool path followed by the transition tooling. Alternately, the step of determining the tool path may include calculating a tool path that leaves an exterior surface of the object at each point where there is a change in build material with an excursion that has sufficient length to place the entire transition away from the surface.

The interplay between the tool path and transitions may be resolved with a variety of techniques. For example, each transition may have a length sufficiently great to permit a first build material (e.g., first color) to evacuate an interior volume of an extruder, as determined empirically or based upon volume displacement or any other suitable technique. As another example, the transition may have a length sufficiently great for a complete change at the nozzle of the extruder from a first color (or build material) to a second color (or build material). This may be particularly useful where volumetric estimates fail to account for residual build material within the extruder that continues to miscolor extruded build material even after extruding a significant multiple of the extruder volume. As noted above, the tool path during these transitions may include an excursion from the object, with the transition occurring during this excursion. This may be an excursion outside an exterior of the object, or along infill structures, or between the infill in interstitial void space. As another example, the tool path may be dynamically monitored with a color camera or the like. With images from this camera, a controller may monitor a color of extrusion from the nozzle and continue to extrude sacrificial material in an excursion from the tool path until the color of extrusion matches the second color of a second build material. Similar measurements such as reflectometry, opacity, or microtexture may also or instead be used, such as for changes from one type of build material to another.

As shown in step 506, a print may be initiated based upon tool instructions including the tool path and transitions described above. In embodiments, the tool path may not explicitly contain or even recognize transitions. In such cases, the tool instructions may optionally include build material change instructions, which may specify a specific, new source of build material, or identify one of a number of sources. Where a machine has only two available sources of material, the change may be simply identified as a change or switch. Where a filament is created with spliced transitions between different materials, the change instructions may be omitted altogether.

As shown in step 508, the process may include changing the build material from the first color to the second color at a corresponding point along the tool path to provide the transition during an extrusion from the nozzle. Changing the build material may include splicing a first length of a filament formed of a first build material having the first color to a second length of a filament formed of a second build material having the second color. That is the two different filaments may be joined together with a butt joint, lap joint, or any other mechanical coupling, and/or adhered using an adhesive, ultrasonic welding, and/or melted together with applied heat and pressure, or any combination of these. In this manner, the two pieces may be coupled together to form a single filament. By synchronizing the feed of this single filament with tool instructions for a multi-color (or other multi-material build), an object may be fabricated having a predetermined distribution of colors (or other materials), and of particularly more aesthetic interest, an image or other color pattern on the outside thereof.

Changing the build material may also or instead include changing from a first build material to a second build material at the feed or other input of the extruder during a build. As noted above, the timing of this change in inputs may be usefully coordinated with other tool instructions so that the unmixed build materials are each deposited in predetermined locations. The transition between these locations may be a sacrificial material deposited outside the exterior of the object, or the transition may be positioned along a portion of a tool path within an interior of the object where color mixing between the two build materials will not be visible. It will also be noted that extrusion has some inherent latency. As such, a tool instruction to change build material should occur prior to an actual location of a color change in the tool path. The amount of margin for this change may depend upon the particular printer being used, and a variety of related printing parameters that might affect the feed through rate for new material being fed into the extruder.

In this general manner, predetermined patterns of colors or other build materials may be deposited in an object to achieve all forms of interesting results. Aesthetic effects such as multi-color images can be rendered on objects. Functional results can also be achieved. For example, sacrificial support structures may be fabricated from materials that are lower in cost, or that dissolve or break away easily from the main structure of an object. Similarly, highly elastic materials may be used to print hinges or other moving parts for objects, or high strength materials may be used to reinforce key structural elements of an object. Electrically conductive polymers may be used to provide electrical busses or other conduction paths within an object. Glow-in-the-dark materials may be used to build glow-in-the-dark images directly into an object. More generally, a wide array of useful and aesthetically pleasing objects and effects can be produced using the material switching techniques contemplated herein.

Figure 6:
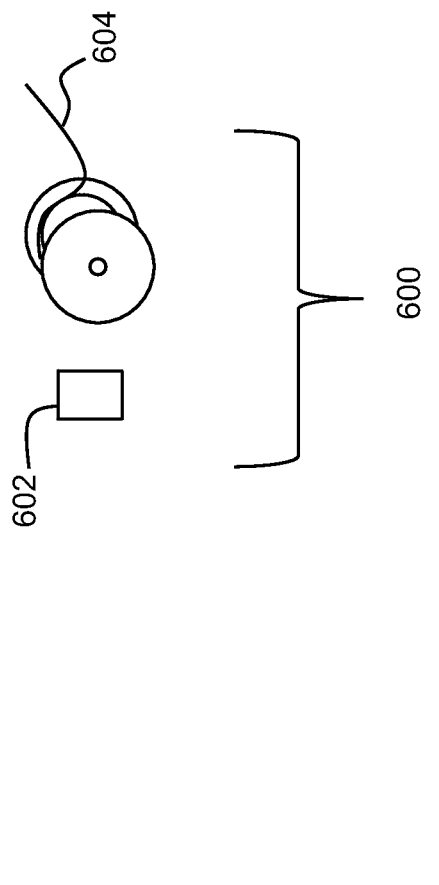
FIG. 6 shows a kit for multi-material printing.

FIG. 6 shows a kit for multi-material printing. The kit 600 may include tool instructions 602 and a length of build material 604.

The tool instructions 602 may be any tool instructions to control a printer in a fabrication process. In general, the tool instructions 602 do not need to contain explicit build material change instructions because the transitions from material to material can be hard-coded (metaphorically speaking) into the length of build material 604, which can contain varying lengths of varying colors (or different materials) spliced together; however, in order for the length of build material 604 to achieve the desired multi-material build, the length of build material 604 should be used specifically with the tool instructions 602, or with a tool instructions creation algorithm that is certain to achieve the same tool path as the tool instructions 602 so that the length of build material 604 is properly synchronized to achieve the desired spatial results.

The tool instructions 602 may be embodied in a non-transitory computer readable medium that, when executed by a three-dimensional printer, fabricate a three-dimensional object by traversing a tool path using a predetermined volumetric delivery rate of a build material. The predetermined volumetric delivery rate may ensure that extruded material is deposited in correct locations along the length of the tool path. In this respect, any suitable proxy for deposition rate (e.g., various combinations of feed rate, tool head speed, layer thickness, layer width, etc.) that ensures synchronization between the tool and the feedstock may suitably be employed. The medium for the tool instructions 602 may be any computer readable medium including a diskette, a USB storage device, a memory stick, a memory card (e.g., an SD card), and so forth. In another aspect, the tool instructions 602 may be stored at a remote location, and the kit may include a URL, a QR code, or other address or resource identifier for retrieving the tool instructions 602 that correspond to the length of build material 604.

In another aspect, a three-dimensional printer may include a scanner or other optical device to interpret the resource identifier, automatically retrieve the tool instructions or a digital model of a corresponding object, and render a display of same. This may, for example, be superimposed in a camera view of the working volume of the three-dimensional printer, or otherwise displayed on a coupled computer or other display device.

The length of build material 604 may be formed into a filament that includes predetermined lengths of two or more different colors of a build material that, when delivered by the three-dimensional printer along the tool path at the predetermined volumetric delivery rate (i.e., according to the tool instructions 602), impart a predetermined image on an exterior of the three-dimensional object. The different materials may be spliced or otherwise joined together using the techniques described above. The length of build material 604 may be provided in any convenient form factor. The material may, for example, be wound on a spool, or secured in a bag or other container in a coiled or other wound form for shipping.

Other accessories may be provided with the kit 600 such as cutting or measuring tools, printed instructions (e.g., with machine settings or compatibility information), finishing materials for the fabricated object, and so forth. The kit 600 may also include any suitable packing and/or shipping materials. In use, the length of build material 604 may be loaded into a printer and fed to an extruder until some predetermined calibration point. For example, the tool instructions may be initiated as soon as material begins to extrude, or after extruding a certain length of material (e.g., six inches), or when the extruded material is a certain color. The tool instructions 602 may then be executed by the printer to fabricate an object from the length of build material 604, resulting in an object having a predetermined distribution of materials (such as colors).

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for three-dimension fabrication using an extruder having a feed to receive a build material and a nozzle to extrude the build material, the method comprising:
   receiving a tool path for the extruder to fabricate an object from a three-dimensional model, the three-dimensional model including a pattern of colors on a surface thereof and the tool path defining interstitial void space between infill formed by the tool path for use in fabricating the object;
   identifying, within the tool path, a change from a first color of the pattern of colors to a second color of the pattern of colors that results in a portion of the pattern of colors on the surface;
   calculating a transition having a transitional length including a beginning and an end for the change from the first color to the second color to occur, the calculation of the transition incorporating a safety margin to ensure that the transition is completed over the transitional length;
   altering the tool path to cause a continuous excursion from the surface of the object for the transition having the transitional length including the safety margin, the transitional length beginning after the continuous excursion from the surface of the object and completing before a return to the surface of the object, wherein the continuous excursion includes a length located within the interstitial void space between infill formed by the tool path;
   changing the build material supplied to the extruder from the first color to the second color; and
   fabricating a portion of the object by moving the extruder along the continuous excursion after changing the build material supplied to the extruder.

2. The method of claim 1 wherein changing the build material includes splicing a first length of a filament formed of a first build material having the first color to a second length of a filament formed of a second build material having the second color.

3. The method of claim 2 further comprising splicing a plurality of lengths of build materials having different colors to form a pre-colored filament before fabricating the object.

4. The method of claim 2 wherein splicing includes coupling the first length to the second length with a mechanical linkage formed in corresponding ends of the first length and the second length.

5. The method of claim 2 wherein splicing includes bonding the first length to the second length with an ultrasonic weld.

6. The method of claim 2 wherein splicing includes bonding the first length to the second length with an adhesive.

7. The method of claim 2 wherein splicing includes joining the first length to the second length with applied heat and pressure.

8. The method of claim 1 wherein changing the build material includes changing from a first build material to a second build material at the feed of the extruder during a build.

9. The method of claim 1 wherein the transitional length is sufficiently great to permit the build material of the first color to evacuate an interior volume of the extruder.

10. The method of claim 1 wherein the transitional length is sufficiently great for a complete change at the nozzle of the extruder from the first color to the second color.

11. The method of claim 1 wherein the pattern of colors is obtained from a digital image.

12. The method of claim 1 wherein the pattern of colors is obtained from a texture map.

* * * * *